United States Patent [19]

Krukoski et al.

[11] Patent Number: 4,756,152
[45] Date of Patent: Jul. 12, 1988

[54] CONTROL FOR BLEED MODULATION DURING ENGINE DECELERATION

[75] Inventors: Leon Krukoski, Coventry; Nicola Laudadio, Rockville, both of Conn.

[73] Assignee: United Technologies Corporation, Hartford, Conn.

[21] Appl. No.: 939,214

[22] Filed: Dec. 8, 1986

[51] Int. Cl.⁴ .............................................. F02C 9/18
[52] U.S. Cl. .................................. 60/39.02; 60/39.29
[58] Field of Search ........................ 60/39.02, 39.29; 415/27, 28

[56] References Cited

U.S. PATENT DOCUMENTS

| | | | |
|---|---|---|---|
| 2,809,492 | 10/1957 | Arkawy | 60/39.28 |
| 3,420,056 | 1/1969 | Eames | 60/39.28 |
| 3,688,504 | 9/1972 | Hutchinson | 60/39.29 |
| 4,058,975 | 11/1977 | Gilbert et al. | 60/39.28 |
| 4,060,979 | 12/1977 | Elsaesser et al. | 60/39.29 |
| 4,102,595 | 7/1978 | Wibbelsman | 415/1 |
| 4,117,668 | 10/1978 | Elsaesser et al. | 60/39.29 |
| 4,122,667 | 10/1978 | Hosaka et al. | 60/39.09 |
| 4,212,161 | 7/1980 | Newirth et al. | 60/39.28 |
| 4,430,855 | 2/1984 | Deneux et al. | 60/39.29 |
| 4,543,782 | 10/1985 | Fitzmaurice | 60/39.281 |
| 4,581,888 | 4/1986 | Schmitzer et al. | 60/39.09 |

OTHER PUBLICATIONS

Sobey et al., *Control of Aircraft and Missile Powerplants*, Wiley and Sons, New York; 1963, pp. 32-33.

*Primary Examiner*—Louis J. Casaregola
*Attorney, Agent, or Firm*—Stephen E. Revis

[57] ABSTRACT

In a twin spool gas turbine engine the electronic engine control modulates the open area of the compressor bleed valves during engine transients as a function of a ratio of the actual rate of change of the compressor speed to a maximum scheduled rate of change such that the bleeds are opened more as the actual rate of change approaches the scheduled maximum rate. This continuous modulation provides smooth thrust transition from one steady state condition to another while maintaining a proper safety margin relative to the engine surge line.

5 Claims, 1 Drawing Sheet

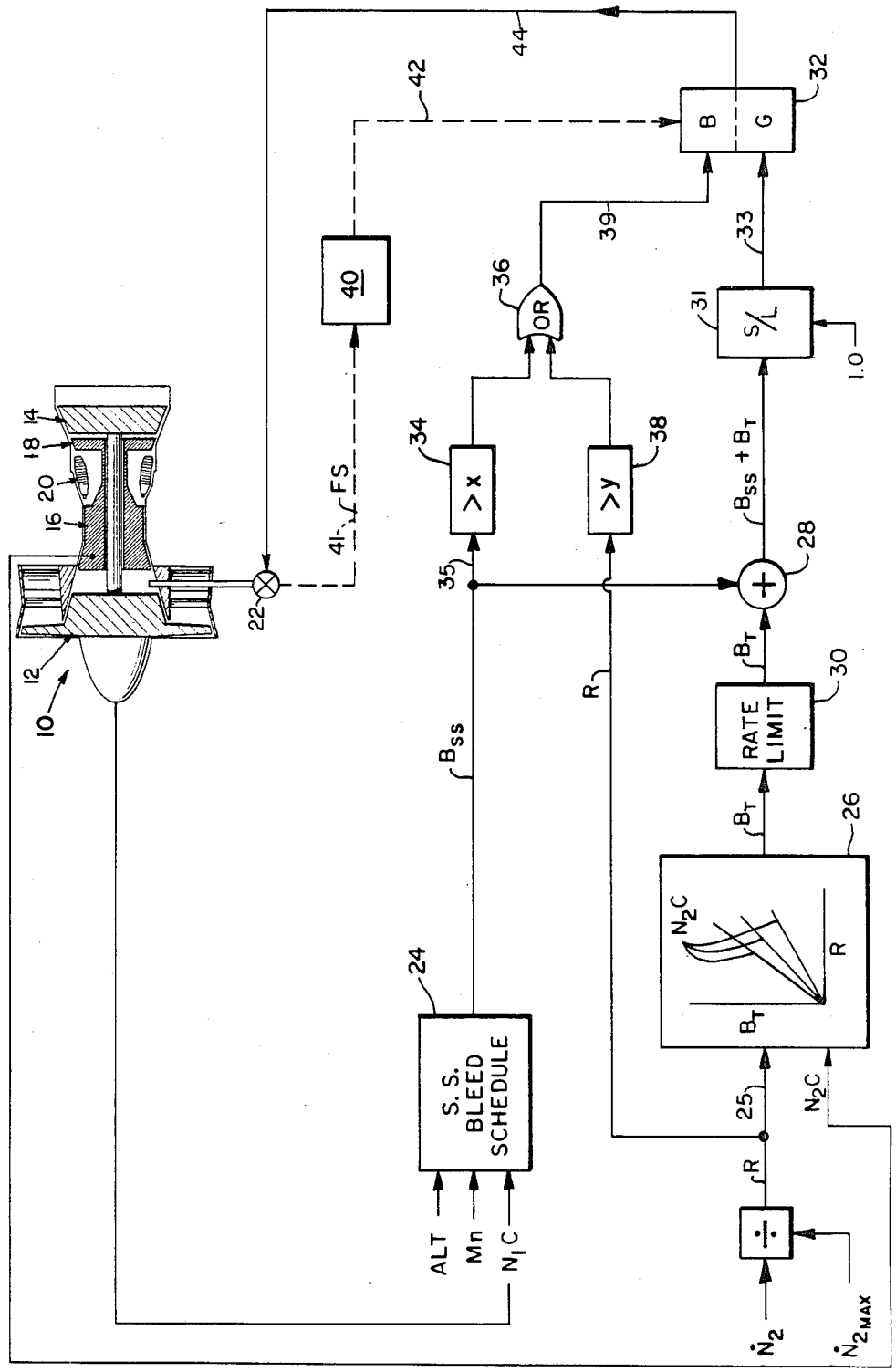

CONTROL FOR BLEED MODULATION DURING ENGINE DECELERATION

DESCRIPTION

1. Technical Field

This invention relates to gas turbine engines and particularly a means for controlling the compressor bleed valves during transient engine operation.

2. Background Art

As is well known in the art, it is necessary to operate gas turbine engines close to the engine's surge line in order to transition from one steady state mode of operation to another as quickly as possible. Excursions beyond the surge line cannot be tolerated inasmuch as surge can result in sudden thrust loss and/or engine overtemperature. Typically, engine controls monitor various engine parameters and include schedules of engine parameters which are used to automatically control the engine, accounting for the surge characteristics of the particular engine (with an adequate safety factor) for which the control is designed.

It is well known in the prior art to modulate a compressor bleed valve between fully open and fully closed during steady state operation to help optimize engine performance. For example, this is done in the twin spool PW2037 engine, manufactured by Pratt and Whitney, a division of United Technologies Corporation. In the bleed control of that engine the bleed position is modulated during steady state on the basis of corrected low pressure rotor speed; however, during engine deceleration the steady state mode is overridden, and the bleed is operated either fully open or fully closed based upon the rate of change in burner pressure compared to a scheduled burner pressure rate of change. Basically, the bleed is popped open when the scheduled rate of change is exceeded. Commonly owned U.S. patent application Ser. No. 683,886, Transient Engine Bleed Control by David F. Kenison et al filed on Dec. 20, 1984, relates to such a bleed control system.

An undesirable feature of such an on-off bleed control system is the sudden thrust changes caused by the sudden opening of the bleed during deceleration, particularly during slow to moderate decelerations.

It is desired to provide the ability to rapidly decelerate with safety, particularly with moderate to slow throttle rates, without abrupt thrust changes associated with transient two position bleed override systems of the prior art.

DISCLOSURE OF INVENTION

One object of the present invention is to reduce the time it takes an engine to pass from one steady state operating mode to another steady state operating mode without stalling.

Another object is a bleed control system which avoids sudden thrust changes during an engine transient.

According to the present invention, during an engine transient a control system modulates a compressor bleed valve between full open and full closed positions as a function of the ratio of the actual rate of speed change of the compressor to a maximum scheduled rate of speed change of the compressor. In essence, the closer the actual rate of change of engine speed is to the maximum scheduled rate of change of engine speed, the more the bleed valve is opened. The scheduled rate of change may be either a fixed or variable schedule.

The invention is particularly useful in twin or multi-spool engines to control the bleed position during engine deceleration. It may also be useful in a single spool engine to control the bleed positions during engine acceleration. In general, the continuous modulation of the bleed valve during engine transients in accordance with teachings of the present invention provides smooth thrust transition from one steady state condition to another while maintaining a proper safety margin relative to the surge line.

In the case of a multi-spool engine, if the pilot calls for maximum deceleration it is desired to decelerate the engine as fast as possible. The engine speed deceleration schedule is essentially the limiting deceleration rate. The slower the actual deceleration rate compared to the scheduled deceleration rate the more closed the bleed valve may be without the risk of surge. As the actual deceleration rate approaches the scheduled deceleration rate the bleed valves are opened proportionately and biased by corrected compressor rotor speed. The bleed valves are scheduled to be fully open at and above a preselected ratio of the actual to scheduled rotor speed deceleration.

The foregoing and other objects, features and advantages of the present invention will become more apparent in the light of the following detailed description of preferred embodiments thereof.

BRIEF DESCRIPTION OF THE DRAWING

The sole FIGURE is a schematic and block diagram of a twin spool gas turbine engine incorporating the control system of the present invention.

BEST MODE FOR CARRYING OUT THE INVENTION

As an exemplary embodiment of the present invention, consider the twin spool turbofan gas turbine engine shown in the drawing and generally represented by the reference numeral 10. The engine comprises a low pressure compressor 12 connected through a shaft to a low pressure turbine 14; a high pressure compressor 16 connected through a shaft to a high pressure turbine 18; and a burner section 20 disposed between the high compressor and high turbine. A bleed valve 22 is disposed between the high and low compressors to dump compressor air from the engine flow path during certain engine operating conditions.

As is well known in the art, and as is the case in the present embodiment, the bleed valve position is regulated by an electronic engine control which also regulates, for example, the fuel flow rate into the burner section. Only that portion of the electronic engine control directly related to the control of the bleed valve 22 is shown in the drawing; and it is shown in a simplified manner for purposes of explanation.

Still referring to the drawing, signals indicative of the corrected low rotor speed $N_1C$, the aircraft Mach number, $Mn$, and aircraft altitude, ALT, are all provided to a function generator 24 which generates a steady state bleed position signal $B_{ss}$ from an empirically developed steady state bleed schedule. $B_{ss}$ indicates the desired steady state position of the bleed valve 22, which may be anywhere from fully closed to 100 percent open.

The rate of change of the high pressure rotor speed ($\dot{N}_2$) is calculated or determined at regular intervals and divided by $\dot{N}_{2max}$ to generate a signal R which is of the ratio of those two derivatives. $\dot{N}_{2max}$ is the maximum permissable rate of compressor speed change in accordance with a predetermined schedule.

The signal R is provided, via a line 25, to a function generator 26 which generates an incremental transient bleed signal $B_T$ which is proportional to R and which is biased by the corrected high pressure rotor speed $N_2C$. $B_T$ is indicative of the fraction (i.e. between 0.0 and 1.0) of the fully opened bleed area which is to be added to the fraction of bleed open area called for by the steady state bleed control. The closer $N_2$ is to $\dot{N}_{2max}$ the larger will be the value of R and the greater will be the called for incremental increase in the bleed open area. The addition of the steady state bleed signal and the transient bleed signal is accomplished in an adder 28. This combined signal is passed to a select-low gate 31, which additionally receives a signal having a value of 1.0. The select-low gate output signal 33 will, therefore, never be greater than 1.0. The output signal 33 is passed to a selector 32 whose function will be explained hereinbelow.

As further shown in the drawing, the steady state bleed position signal $B_{ss}$ is also delivered into a discriminator 34 which determines whether the value of the steady state bleed position signal $B_{ss}$ is greater than a predetermined amount x. If the statement in the discriminator is true, the discriminator sends a signal to an OR gate 36. The signal R is sent to a discriminator 38; and, if the value of the ratio R is greater than y, the discriminator 38 sends a signal to the OR gate 36. The OR gate 36 will send a signal 39 having a value of 1.0 to the selector 32 if it receives a signal from either the discriminator 34 or the discriminator 38. Otherwise the signal 39 will be non-existent or zero.

A feedback signal FS is sent from the bleed valve 22 to determinator 40 via line 41. The determinator 40 sends a signal 42 to the selector 32 when the feedback signal is either unavailable or unreliable, which means that the present position or open area of the bleed valve cannot be determined. If the selector 32 does not receive such a signal, it means the feedback signal FS is good (G) and the selector output signal 44 will be the value of the signal 33, which is the lower of 1.0 or the sum of the steady state bleed position signal $B_{ss}$ and the incremental transient bleed position signal $B_T$. That bleed request signal is then used to position the bleed valve. On the other hand, if a signal 42 is sent to the selector 32, it means the feedback signal is bad (B). The selector output signal 44 will then be the signal 39 (i.e., 1.0) from the OR gate 36, if there is one, in which case the output signal 44 from the selector 32 fully opens the bleed valve 22. If there is no signal 39 from the OR gate 36 then the output signal 44 from the selector 32 will fully close the bleed valve.

From the foregoing it can be seen that when there is a failure in the feedback signal 41 the control operates the valve 22 in either a fully open or fully closed mode. The fully open mode is used when the actual high pressure compressor derivative $\dot{N}_2$ gets too close to the maximum scheduled value $\dot{N}_{2max}$. For example, the value of y may be 0.6. In the feedback failure mode the bleed valve 22 will also be fully opened if the fraction of open area called for by the bleed request signal $B_{ss}$ is greater than some preselected value x. Otherwise the bleed valve is fully closed. When the feedback position signal 41 is reliable then the bleed will be positioned in accordance with the steady state bleed signal $B_{ss}$ plus any incremental amounts indicated by $B_T$. That incremental amount will be zero for all negative values of R (which means the engine is accelerating) less than a predetermined maximum value built into the schedule of function generator 26. Very small positive values of R are likely not to require any change in the steady state bleed valve position.

As the rate of deceleration slows and in situations where the pilot suddenly calls for an acceleration in the midst of a deceleration, the value of the incremental transient bleed position signal $B_T$ as generated by the function generator 26 would be reduced from previous values and may even be suddenly eliminated (i.e., $B_T=0$). If this incremental value is reduced or removed too suddenly, engine stability might not be maintained. A rate limiter 30 is provided which operates to control or limit the rate at which a reduction in the value of $B_T$ is applied to the adder 28. This simply prevents the bleed valve from closing too rapidly under certain conditions.

In a single spool engine the problem of smooth transition from one steady state position to another typically occurs during accelerations rather than decelerations of the engine. It should be apparent that the present invention could be used in such an application.

Although the invention has been shown and described with respect to a preferred embodiment thereof, it should be understood by those skilled in the art that other various changes and omissions in the form and detail of the invention may be made without departing from the spirit and scope thereof.

What is claimed is:

1. In a gas turbine engine having a compressor, and a compressor bleed valve, means for controlling said valve comprising:
   means for generating a first signal indicative of corrected compressor speed;
   means for producing a second signal indicative of the ratio of the actual rate of change of corrected compressor speed to a maximum scheduled rate of change of corrected compressor speed;
   function generator means responsive to said first and second signals to generate, during engine transient operation, a transient bleed position signal having a value which is a function of said ratio;
   means for producing a steady state bleed position signal appropriate for steady state engine operation;
   means for adding said steady state bleed position signal to said transient bleed position signal to produce a combined signal; and
   means responsive to said combined signal for modulating, as a function of the value of said combined signal, the position of said bleed valve during said transient engine operation.

2. In a gas turbine multi-spool engine having a high pressure compressor, a low pressure compressor, and a compressor bleed valve, means for controlling said bleed valve comprising:
   means for generating a first signal indicative of corrected high pressure compressor speed;
   means for producing a second signal indicative of the ratio of the actual rate of change of high pressure compressor speed to a maximum scheduled rate of change of high pressure compressor speed;
   function generator means responsive to said first and second signals to generate, during engine deceleration, a transient bleed position signal having a value which is proportional to said ratio;

means for producing a steady state bleed position signal appropriate for steady state engine operation, and for adding said steady state and transient bleed position signals to produce a combined bleed position signal;

modulating means responsive to said steady state bleed position signal for modulating the position of said bleed valve only as a function of said steady state bleed position signal during steady state engine operation and during engine acceleration and responsive to said combined signal during engine deceleration for modulating the bleed valve position as a function of said combined signal during engine deceleration;

means for detecting the position of said bleed valve and for generating a feedback signal indicative thereof;

means for determining if there is a failure in said feedback signal; and means for overriding said proportional bleed position signal and for positioning said bleed valve in a full open or full closed position upon determining said feedback signal has failed.

3. In the method for controlling a gas turbine engine having a high pressure compressor, a low pressure compressor, and a compressor bleed valve, the steps of modulating the position of the bleed valve during steady state engine operation as a function of a steady state first bleed position signal; generating a second bleed position signal proportional to the ratio of actual rate of change of high pressure compressor speed to a maximum scheduled rate of change of high pressure compressor speed; adding said first and second signals and modulating said bleed valve position as a function of the sum of said signals only during deceleration of said engine; detecting the position of the bleed valve and generating a feedback signal indicative thereof; determining if said feedback signal is unavailable or unreliable; and operating the bleed valve in a non-modulating open-closed fashion when said feedback signal is unavailable or unreliable.

4. The method of controlling an engine according to claim 3 wherein modulation of the bleed valve during engine deceleration is rate limited to prevent too rapid a rate of closure of the bleed valve when the engine is suddenly requested to accelerate during deceleration.

5. The method according to claim 3, including fully opening the bleed valve when the rate of change ratio exceeds a preselected value and said feedback signal is unavailable or unreliable.

* * * * *

UNITED STATES PATENT AND TRADEMARK OFFICE
CERTIFICATE OF CORRECTION

PATENT NO. : 4,756,152

DATED : July 12, 1988

INVENTOR(S) : Leon Krukoski and Nicola Laudadio

It is certified that error appears in the above-identified patent and that said Letters Patent is hereby corrected as shown below:

Column 2, line 68, "$N_{2max}$" should be --$\dot{N}_{2max}$--.

Column 3, line 1, "$N_{2max}$" should be --$\dot{N}_{2max}$--.

Column 3, line 11, "$N_2$" should be --$\dot{N}_2$--.

Signed and Sealed this

Fourteenth Day of February, 1989

Attest:

DONALD J. QUIGG

*Attesting Officer*          *Commissioner of Patents and Trademarks*